United States Patent [19]
Zahaykevich

[11] 3,912,357
[45] Oct. 14, 1975

[54] METER SOCKET

[75] Inventor: Bohdan Zahaykevich, Newark, N.J.

[73] Assignee: Federal Pacific Electric Company, Newark, N.J.

[22] Filed: Jan. 25, 1974

[21] Appl. No.: 436,736

[52] U.S. Cl. .......................... 339/198 M; 339/219 F
[51] Int. Cl.² ........................................... H01R 9/00
[58] Field of Search .......... 339/198 M, 31 B, 217 R, 339/219 R, 219 F, 125 R; 317/105–111

[56] References Cited
UNITED STATES PATENTS

| | | | |
|---|---|---|---|
| 2,880,380 | 3/1959 | Schmidt et al. | 339/31 B |
| 3,131,984 | 5/1964 | Kobryner | 339/31 B |
| 3,353,142 | 11/1967 | Spencer | 339/219 F |
| 3,394,340 | 7/1968 | Kobryner | 339/217 R |
| 3,662,323 | 5/1972 | Stanback | 339/217 R |
| 3,731,253 | 5/1973 | Coffey | 339/198 M |
| 3,735,332 | 5/1973 | Tirrell | 339/217 R |

*Primary Examiner*—Joseph H. McGlynn
*Assistant Examiner*—James W. Davie

[57] ABSTRACT

A common form of meter socket has five plug-in terminals on an insulation base plate for the blades of a watt-hour meter, including a grounding terminal which is often required to be installed in the field at a selected position on the base plate. A novel plug-in terminal and the cooperating formation of the base plate represents an economical construction facilitating mounting of the plug-in terminal. The novel plug-in terminal includes a mounting portion which is inserted through a large portion of an aperture in the base plate and then shifted into a smaller portion of the aperture where a lip of the mounting portion overlies the base plate. A fastener which is useful for securing a circuit connection to the terminal is then adjusted to prevent shift of the mounting portion out of said smaller portion of the aperture and to restrain the terminal against twisting.

8 Claims, 8 Drawing Figures

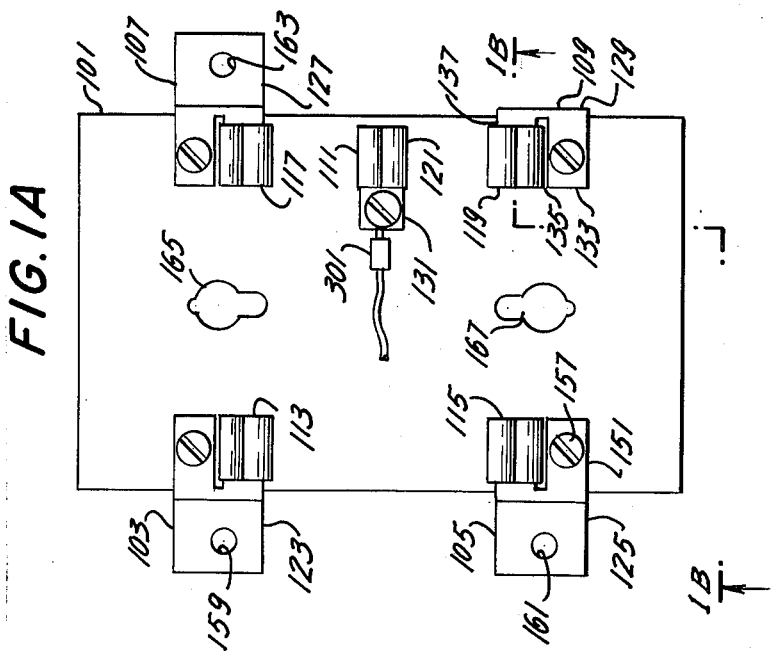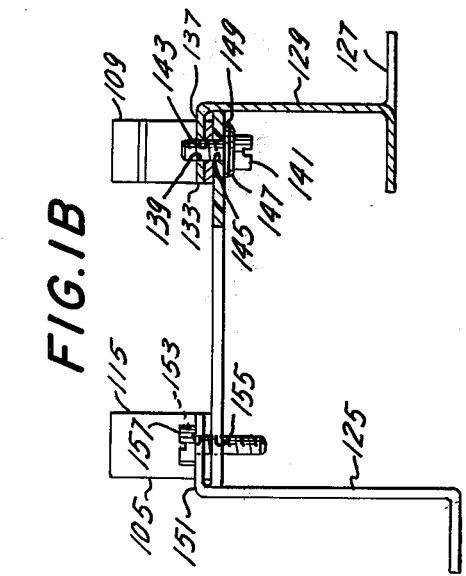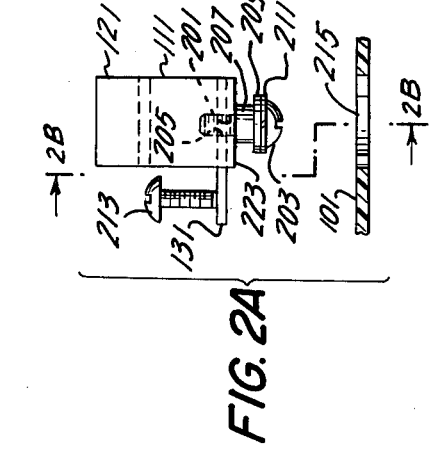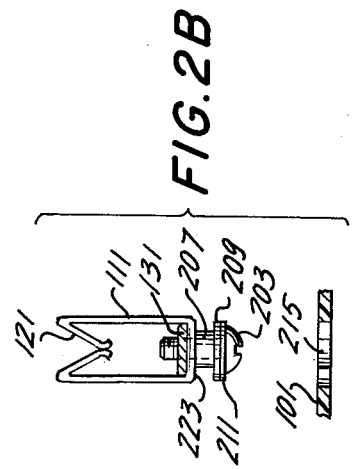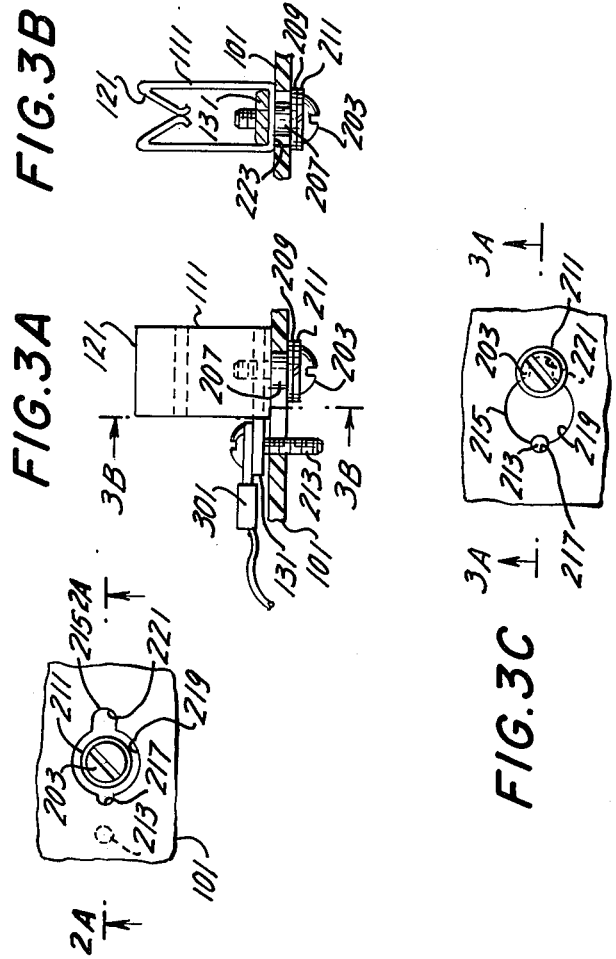

METER SOCKET

BACKGROUND OF THE INVENTION

1. Field of the Invention

This invention relates to meter sockets and particularly the type that detachably receives a five and/or six blade plug-in watt-hour meter.

2. Description of the Prior Art

The standard single phase watt-hour meter has four contact blades which are received in four clips of a meter socket. Two of the blades of the meter are connected to the line side of the system and two of its blades are connected to the load side of the system. The meter socket also includes a neutral or grounding terminal clip, to receive a neutral blade of the meter. The location of the grounding clip of the socket in relation to the line and load clips varies in dependence on local preferences of different electric utilities. Consequently, it is common practice for the grounding clip of the meter socket to be installed in the field when the meter socket equipment is being installed.

In some applications, two additional terminals are installed in the field to connect the meter to either switches or timers.

SUMMARY OF THE INVENTION

Meter sockets of the present invention include a base plate of electrical insulation and a plurality of plug-in terminals for receiving the terminal blades of a meter. At least one of the plug-in terminals has the customary clip to receive a meter blade, overlying one side of the base plate adjacent an edge portion of the base plate. A mounting portion of the terminal extends across an edge portion of the base plate and has a lip portion overlying the other side of the base plate. The terminal has a fastener extending across another edge portion of the base plate, so located as to prevent movement of the terminal in a direction that would allow the plug-in terminal to shift to a released position in the absence of the fastener.

It is an object of the invention to provide a meter socket wherein additional terminals can be easily and quickly installed.

An additional object of the invention resides in providing a novel form of plug-in terminal of economical construction.

BRIEF DESCRIPTION OF THE DRAWINGS

FIG. 1A is a front or top plan view of a meter socket as an illustrative embodiment of the invention.

FIG. 1B is a side view of the meter socket of FIG. 1A, partially in cross-section, as seen from the line 1B—1B in FIG. 1.

FIGS. 2A, 2B and 2C illustrate a plug-in terminal together with but separated from a portion of the base plate of the meter socket of FIG. 1, drawn to larger scale. FIG. 2A is a side view of the plug-in terminal and a cross-section of the portion of the base plate at the plane 2A—2A of FIG. 2C. FIG. 2B is an end view of the plug-in terminal and base plate portion of FIG. 2A, partially in cross-section as viewed from the line 2B—2B of FIG. 2A. FIG. 2C is a bottom view of the parts in FIG. 2A.

FIGS. 3A, 3B and 3C are views of a plug-in terminal, and a portion of the base plate in assembled condition, corresponding to FIGS. 2A, 2B and 2C, respectively.

DESCRIPTION OF THE PREFERRED EMBODIMENT

FIGS. 1A and 1B show a meter socket consisting of a base plate 101 of electrical insulation and five plug-in terminals 103, 105, 107, 109 and 111. Each of the plug-in terminals has a clip or jaw 113, 115, 117, 119, 121, designed to receive the terminal blade of a meter (not shown) and a conductive link or terminal member 123, 125, 127, 129, 131. Plug-in terminals 103, 105, 107 and 109 are of a known standardized construction.

As shown in FIG. 1B, each end of the conductive links (links 125 and 127 being shown) is bent at right angles to the main part of the link. The end 133 of link 129 as an example, to be secured to clip 109, is provided with a slot 135 and the resulting prong 137, on one side of the slot 135, is placed within clip 109. A hole 139 in prong 137, threaded for screw 141, is aligned with clearance holes 143 and 145 for screw 141, in the base of clip 109 and in the base plate 101 respectively. A belville washer 147, to exert continual firm pressure, and a regular washer 149 to distribute that pressure, are provided. Screw 141 is passed through washers 147 and 149 and clearance holes 145 and 143, and tightened in threaded hole 139. As shown in FIG. 1A, four of the plug-in terminals 103, 105, 107 and 109 are secured to the base plate 101 in this manner.

To prevent twisting of the assembled plug-in terminal and conductive link on the base plate, the prong not placed within the clip, as for example 151 of link 125, is also provided with a threaded hole 153 which is aligned over a clearance hole 155 in the base plate 101. A screw 157, secured in threaded hole 153 and extending through clearance hole 155, prevents such twisting.

Secured in such fashion to base plate 101, plug-in terminals 103, 105, 107 and 109 are designed to connect the meter to the line and load side of the system. For example, in the illustration of FIG. 1, the longer links 123 and 125 would connect the meter to the line side, while the shorter links 127 and 129 would connect the meter to the load side. The holes 159, 161, 163 in the end of each of links 123, 125 and 127 and the hole (not shown) in the end of link 129 are provided to effect such connection.

Grounding plug-in terminal 111 is provided to accommodate the ground blade of the meter.

As described above, plug-in terminal 111 includes clip 121 and conductive link 131. As shown in FIGS. 2A and 2B, clip 121 is similar to the other clips on the socket 113, 115, 117 and 119 in that it too has a clearance hole 201 in its base large enough to accommodate a screw 203. Similarly, one end of terminal member 131, placed within clip 121, and has a hole 205, threaded for screw 203.

Screw 203 is provided with a spacing collar 207, a regular washer 209, and a lock washer 211. These components are united by screw 203 inserted through clearance hole 201 and threaded into hole 205, securely fastening the clip 121 to the terminal member 131. In addition, they serve as means by which the plug-in terminal 111 is mounted on base plate 101.

The clip 121, link 131, collar 207, washers 209 and 211 and screw 203 are tightly pre-assembled as a mounting unit. Spacer collar 207 forming a transverse portion of the mounting unit is of such size that the distance between the bottom of clip 121 and the facing surface of washer 209 is sufficient to accommodate base plate 101. The end of terminal member 131, not placed within clip 121, also has a hole (not shown) threaded to accommodate fastener screw 213. Screw 213 is loosely threaded into conductive link 131, as a part of the plug-in terminal 111. Taken together screws 203 and 213, washers 209 and 211, and collar 207 constitute the means by which the plug-in terminal 111 is secured on the base plate 101.

To receive plug-in terminal 111, base plate 101 is provided with at least one aperture 215 of essentially key-hole shape. Aperture 215 consists of three connected portions 217, 219, 221 of different widths, in line, the large-width portion being between the smaller-width portions. The diameter of portion 219 is sufficiently large to admit washers 209 and 211, but distinctly smaller than clip 121. The diameter of portion 221 is just large enough to accommodate collar 207, but smaller than washer 209. The diameter of portion 217 is just sufficient to accommodate the shank of screw 213.

In mounting the plug-in terminal 111 to base plate 101, the united screw 203, collar 207, and washers 209 and 211 are inserted into portion 219 of aperture 215. At this time, fastener screw 213 is raised or removed so that its shank does not make contact with base plate 101.

FIGS. 3A, B and C show the plug-in terminal after insertion into hole portion 219 and after being shifted so that spacing collar 207 is received in hole portion 221. Washer 221 now constitutes a lip or shoulder overlying the second side of base plate 101 adjacent hole portion 221. At this time, fastener screw 213 is aligned with hole portion 217. When screw 213 is driven into the threaded hole, the shank of the screw 213 enters hole portion 217. In this postion the edges of hole portion 217 surrounding fastener screw 213 prevents lateral movement of plug-in terminal 111 so that collar 207 is constrained to remain in hole portion 221. At the same time the opposing flanking edges of hole portions 217 and 211, surrounding screw 213 and collar 207, prevent twisting movement of the plug-in terminal. Raising fastener screw 213 so that its shank is no longer positioned adjacent the edge of hole portion 217, permits lateral movement and total removal of plug-in terminal 111.

As shown in FIGS. 1A and 3A, fastener screw 213 in its lowered position also serves to fasten a grounding connection such as lug 301 to plug-in terminal 111.

Referring again to FIG. 1A, base plate 101 is shown with plug-in terminal 111 mounted in aperture 215 (FIGS. 3A, B and C). Also provided are two additional apertures 165 and 167, similar to aperture 215. The three apertures are located in what is commonly called the 3 o'clock, 6 o'clock and 9 o'clock positions about the center of base plate 101. Plug-in terminal 111 is installed in one of these positions depending on the local requirement. In other applications, by installing plug-in terminal 111 in both the 3 o'clock and 9 o'clock positions, the timer and switches of the meter can be connected to external circuitry.

It can be seen that the present meter socket with apertured base plate and plug-in terminals lends itself very readily to field installation and rearrangement. Plug-in terminals can be installed and removed, and their positions can be changed with ease and dispatch.

Screw 203, collar 207 and washers 209 and 211 form a permanent, rigid headed projection from the bottom of clip 121. In the illustrated form of such headed projection, screw 203 which secures the plug-in terminal 111 to base plate 101, also secures the terminal member 131 to the clip 121. Screw 213, which prevents the terminal unit 111 from shifting on base plate 101 to a released position also serves to secure an external circuit connection 301 to terminal member 131.

This economy of component functions and ease of modification can be accomplished by other methods contemplated to be within the scope of the invention. For example, the screw 203, collar 207 and washer 209 could be formed as one solid component instead of an assembly of three separate pieces. Other modifications of the illustrative embodiment are considered to be well within the scope of the invention.

What is claimed is:

1. A meter socket including a base plate of electrical insulation having a first and second side and being formed to define at least one aperture and a plurality of plug-in terminals having clips for receiving terminal blades of a meter, at least one of said plug-in terminals having a first portion comprising the blade-receiving clip thereof, a mounting portion including a laterally extending lip and a transverse portion extending from said first portion to said lip, and a fastener, said first portion overlying said first side of said base plate adjacent said aperture, said aperture having a first aperture portion sufficiently large to receive said transverse portion including said laterally extending lip, a second aperture portion connected to said first aperture portion sufficiently large to receive said mounting portion but too small to receive said laterally extending lip, and a third aperture portion connected to said first aperture portion opposite said second aperture portion sufficiently large to receive a portion of said fastener, said plug-in terminal being capable of having said mounting portion received in said first aperture portion and then laterally shifted into said second aperture portion, said laterally extending lip then overlying said second side of said base plate adjacent said second aperture portion, said portion of said fastener being disposed in said third aperture portion and cooperating with the edges thereof for preventing lateral shifting of said mounting portion out of said second aperture portion and additionally preventing twisting of said plug-in terminal relative to said base plate.

2. A meter socket as claimed in claim 1, wherein said second aperture portion is defined in part by opposite edges flanking said mounting portion and said third aperture portion is defined in part by edges flanking opposite sides of said portion of said fastener to prevent twisting of said plug-in terminal relative to said base plate.

3. A meter socket as claimed in claim 1, wherein said fastener, when said portion thereof is disposed in said third aperture portion is adapted to secure a circuit connection to said clip.

4. A meter socket as claimed in claim 3, wherein a terminal member is connected to said clip by said mounting portion and wherein said fastener is threaded into said terminal member.

5. A meter socket including a base plate of electrical insulation having first and second sides, first and second edge portions spaced apart in a direction parallel to said first side of the base plate and a plurality of plug-in terminals for receiving terminal blades of a meter, at least one of said plug-in terminals including a meter-blade receiving clip, and means for mounting and securing said clip on said first side of said base plate, said mounting and securing means including a fastener and means unitary with said clip to constitute a mounting unit having a first portion overlying said first side of said base plate adjacent said first edge portion, a transverse portion extending from said first portion across said first edge portion and closely adjacent thereto and a lip extending from said transverse portion and overlying said second side of the base plate, said mounting unit being movable as a unit in the absence of said fastener into position wherein said lip portion clears said first edge portion, and said fastener having a portion extending from said first portion of the mounting unit into position opposite said second edge portion of the base plate and closely adjacent thereto and cooperable therewith for preventing movement of said mounting unit into position releasing said mounting unit from the base plate.

6. A meter socket as in claim 5, wherein said fastener comprises a screw adapted to be inserted into said first portion of the mounting unit when the lip of the mounting unit overlies said second side of the base plate.

7. A meter socket as in claim 5, wherein said mounting unit including said first portion, said transverse portion and said lip is a substantially rigid structure.

8. A meter socket as in claim 5, wherein said mounting unit including said first portion, said transverse portion and said lip is a substantially rigid structure, and wherein said fastener comprises a screw adapted to be inserted into said first portion of the mounting unit when the lip of the mounting unit overlies said second side of the base plate, said meter socket further including a circuit connecting element secured by said screw to said first portion of said mounting unit.

* * * * *